US012627784B2

(12) United States Patent
McIlree et al.

(10) Patent No.: US 12,627,784 B2
(45) Date of Patent: May 12, 2026

(54) HEAD-MOUNTED ELECTRONIC DEVICE WITH DISPLAY RECORDING CAPABILITY

(71) Applicant: Apple Inc., Cupertino, CA (US)

(72) Inventors: James C McIlree, Santa Clara, CA (US); Jacob Wilson, San Francisco, CA (US); Jérôme Decoodt, L'Étang-la-Ville (FR); Pierre d'Herbemont, Paris (FR); Seyedpooya Mirhosseini, Santa Clara, CA (US); Xutao Jiang, Montreal (CA)

(73) Assignee: Apple Inc., Cupertino, CA (US)

( * ) Notice: Subject to any disclaimer, the term of this patent is extended or adjusted under 35 U.S.C. 154(b) by 86 days.

(21) Appl. No.: 18/488,613

(22) Filed: Oct. 17, 2023

(65) Prior Publication Data

US 2024/0205380 A1    Jun. 20, 2024

Related U.S. Application Data

(60) Provisional application No. 63/433,340, filed on Dec. 16, 2022.

(51) Int. Cl.
*H04N 13/156* (2018.01)
*H04N 13/167* (2018.01)
(Continued)

(52) U.S. Cl.
CPC ......... *H04N 13/156* (2018.05); *H04N 13/167* (2018.05); *H04N 13/189* (2018.05); *H04N 13/327* (2018.05); *H04N 13/383* (2018.05)

(58) Field of Classification Search
CPC .. H04N 13/156; H04N 13/167; H04N 13/189; H04N 13/327; H04N 13/383;
(Continued)

(56) References Cited

U.S. PATENT DOCUMENTS 6,975,324 B1    12/2005  Valmiki et al.
10,843,088 B2   11/2020  Rimon
(Continued)

FOREIGN PATENT DOCUMENTS

WO    2018092147 A1    5/2018
WO    2022147455 A1    7/2022

*Primary Examiner* — Helen Shibru
(74) *Attorney, Agent, or Firm* — Treyz Law Group, P.C.; Jason Tsai; Jinie M. Guihan

(57) ABSTRACT

A head-mounted device is provided that includes a variety of subsystems for generating extended reality content, displaying the extended reality content, and recording the extended reality content. The device can include a graphics rendering pipeline configured to render virtual content, tracking sensors configured to obtain user tracking information, a virtual content compositor configured to composite virtual frames based on the virtual content and the user tracking information, cameras configured to capture a video feed, a media merging compositor configured to overlay the composited virtual frames and the video feed to output merged video frames having a first frame rate for display, and a recording pipeline configured to record content having a second frame rate different than the first frame rate. The recording pipeline can record content exhibiting a higher quality than the content being displayed. A portion of the recorded content containing sensitive information can optionally be blurred.

20 Claims, 6 Drawing Sheets

RECEIVE AT VIRTUAL CONTENT COMPOSITOR MULTIPLE DATA SOURCES INCLUDING RENDERED CONTENT FOR ONE EYE AT HIGHER RESOLUTION — 100

FOR EACH COMPOSITED VIRTUAL FRAME, VIRTUAL CONTENT COMPOSITOR BUILDS A DESCRIPTOR LISTING IMAGE CORRECTIVE FUNCTIONS PERFORMED TO COMPOSITE THAT VIRTUAL FRAME — 102

MERGE COMPOSITED VIRTUAL FRAMES WITH PASSTHROUGH FEED FOR DISPLAY OUTPUT OR OPTIONALLY DISABLE DISPLAY ENTIRELY — 104

VIRTUAL CONTENT COMPOSITOR READS DESCRIPTOR FROM SHARED MEMORY AND GENERATES CORRESPONDING HIGH QUALITY RECOMPOSITED VIRTUAL FRAME BASED ON DESCRIPTOR — 106

RECORDER MERGES HIGH QUALITY RECOMPOSITED VIRTUAL FRAME WITH PASSTHROUGH FEED, PERFORM ADDITIONAL PROCESSING, AND SAVE TO MEMORY FOR RECORDING — 108

(51) Int. Cl.
    *H04N 13/189*       (2018.01)
    *H04N 13/327*       (2018.01)
    *H04N 13/383*       (2018.01)

(58) Field of Classification Search
    CPC ...... H04N 5/92; H04N 13/344; G02B 27/017;
                  G02B 2027/0187; G06F 3/012; G06F
                                   3/013; G06F 3/011
    USPC ........................................................... 348/43
    See application file for complete search history.

(56)                       References Cited

U.S. PATENT DOCUMENTS

| | | | |
|---|---|---|---|
| 10,937,391 B2 | 3/2021 | Griswold et al. | |
| 11,024,086 B2 * | 6/2021 | Tate-Gans | G06T 19/006 |
| 11,706,067 B2 * | 7/2023 | Lee | H04L 27/2275 |
| | | | 370/215 |
| 12,108,184 B1 * | 10/2024 | Reif | H04N 5/44504 |
| 12,223,104 B2 * | 2/2025 | LeBeau | G06T 11/00 |
| 12,445,759 B2 * | 10/2025 | Fenner | H04R 1/028 |
| 12,535,983 B2 * | 1/2026 | Pinon | G06F 3/1454 |
| 2009/0237492 A1 | 9/2009 | Kikinis et al. | |
| 2012/0098831 A1 | 4/2012 | Kim et al. | |
| 2024/0107183 A1 * | 3/2024 | Cheung | H04N 23/86 |
| 2024/0323342 A1 * | 9/2024 | Al Sharnouby | G06F 3/013 |
| 2024/0404213 A1 * | 12/2024 | Mcilree | G06F 3/011 |

* cited by examiner

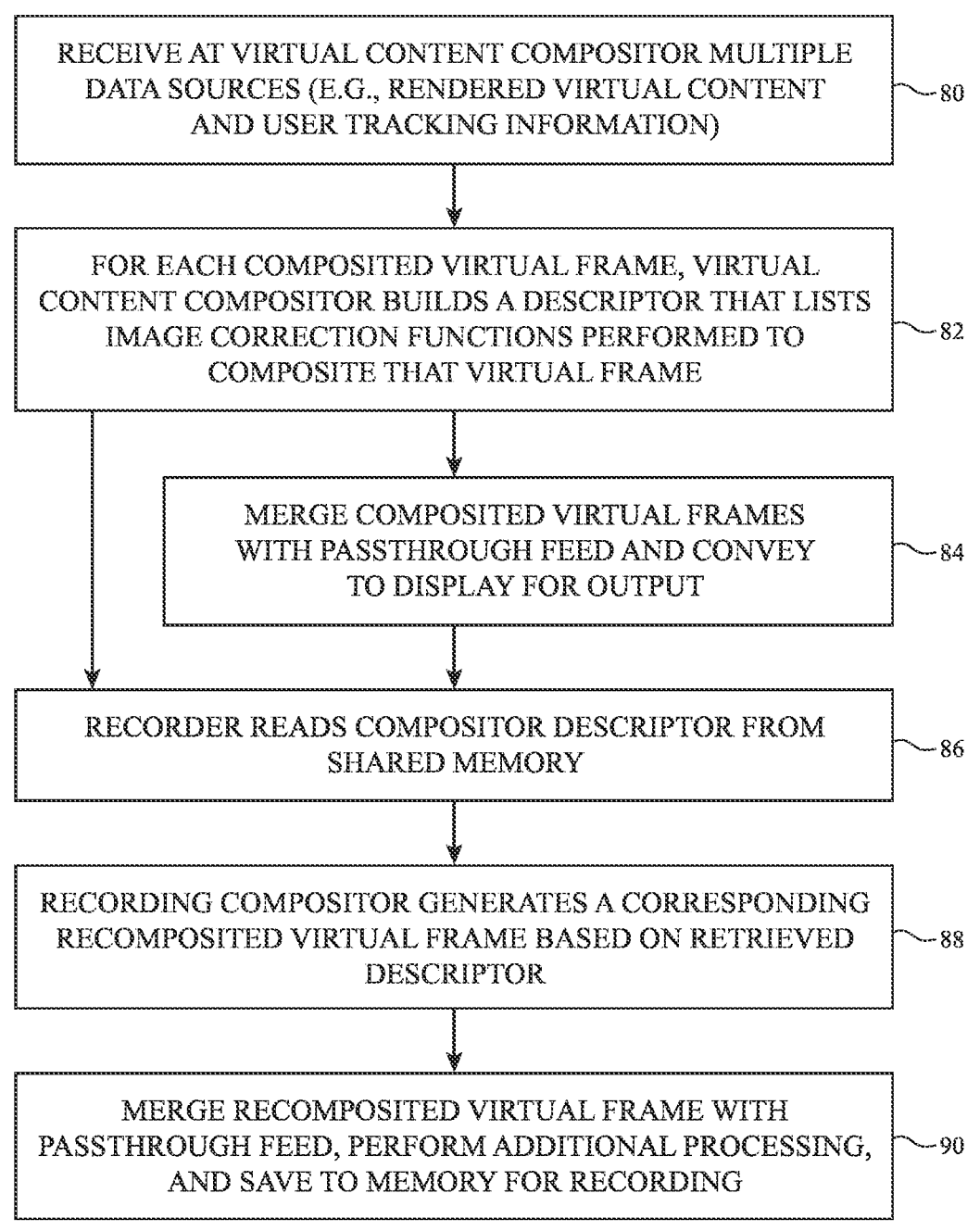

RECEIVE AT VIRTUAL CONTENT COMPOSITOR MULTIPLE DATA SOURCES (E.G., RENDERED VIRTUAL CONTENT AND USER TRACKING INFORMATION) ~80

FOR EACH COMPOSITED VIRTUAL FRAME, VIRTUAL CONTENT COMPOSITOR BUILDS A DESCRIPTOR THAT LISTS IMAGE CORRECTION FUNCTIONS PERFORMED TO COMPOSITE THAT VIRTUAL FRAME ~82

MERGE COMPOSITED VIRTUAL FRAMES WITH PASSTHROUGH FEED AND CONVEY TO DISPLAY FOR OUTPUT ~84

RECORDER READS COMPOSITOR DESCRIPTOR FROM SHARED MEMORY ~86

RECORDING COMPOSITOR GENERATES A CORRESPONDING RECOMPOSITED VIRTUAL FRAME BASED ON RETRIEVED DESCRIPTOR ~88

MERGE RECOMPOSITED VIRTUAL FRAME WITH PASSTHROUGH FEED, PERFORM ADDITIONAL PROCESSING, AND SAVE TO MEMORY FOR RECORDING ~90

*FIG. 4*

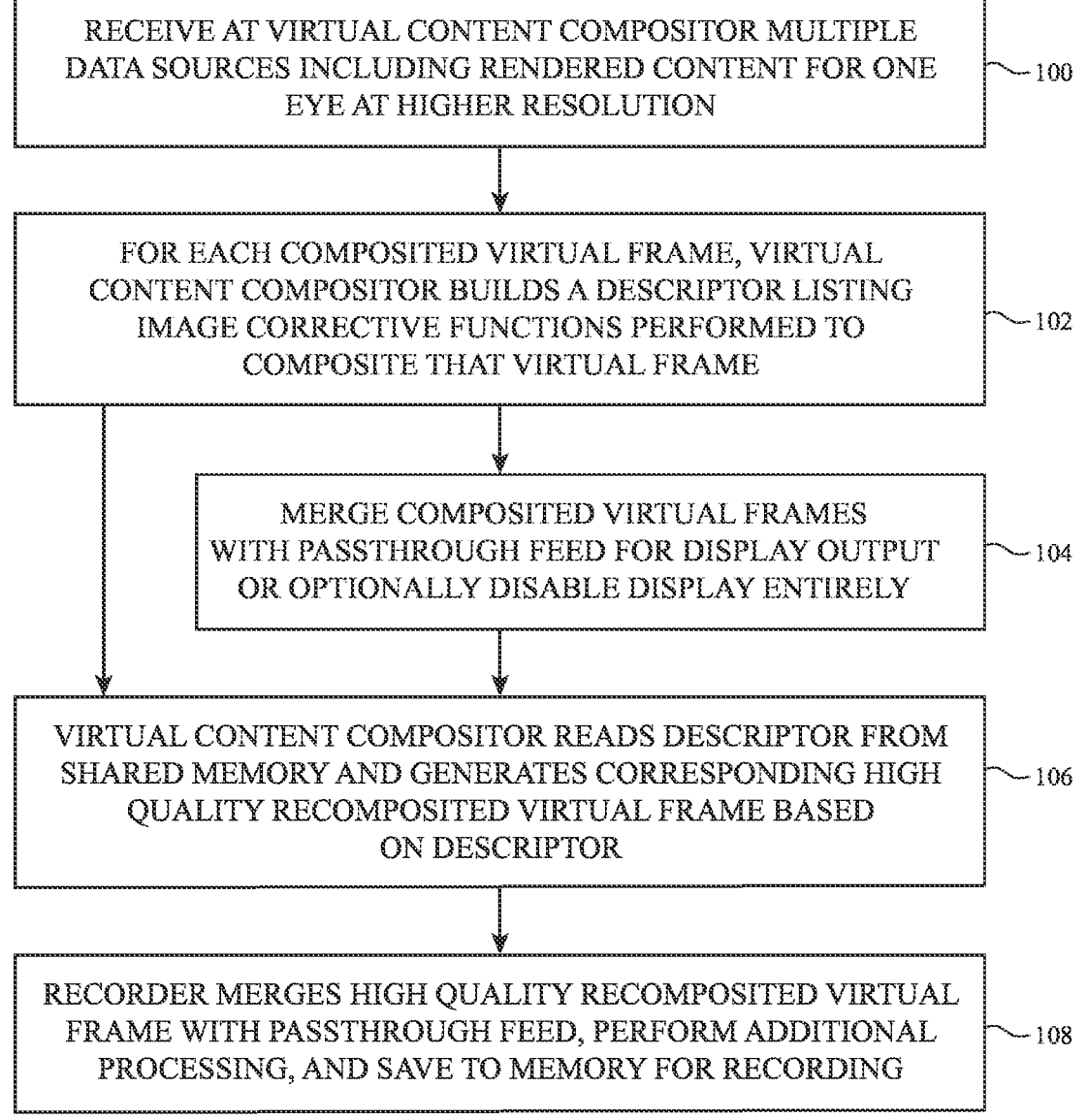

RECEIVE AT VIRTUAL CONTENT COMPOSITOR MULTIPLE DATA SOURCES INCLUDING RENDERED CONTENT FOR ONE EYE AT HIGHER RESOLUTION ~100

FOR EACH COMPOSITED VIRTUAL FRAME, VIRTUAL CONTENT COMPOSITOR BUILDS A DESCRIPTOR LISTING IMAGE CORRECTIVE FUNCTIONS PERFORMED TO COMPOSITE THAT VIRTUAL FRAME ~102

MERGE COMPOSITED VIRTUAL FRAMES WITH PASSTHROUGH FEED FOR DISPLAY OUTPUT OR OPTIONALLY DISABLE DISPLAY ENTIRELY ~104

VIRTUAL CONTENT COMPOSITOR READS DESCRIPTOR FROM SHARED MEMORY AND GENERATES CORRESPONDING HIGH QUALITY RECOMPOSITED VIRTUAL FRAME BASED ON DESCRIPTOR ~106

RECORDER MERGES HIGH QUALITY RECOMPOSITED VIRTUAL FRAME WITH PASSTHROUGH FEED, PERFORM ADDITIONAL PROCESSING, AND SAVE TO MEMORY FOR RECORDING ~108

*FIG. 6*

HEAD-MOUNTED ELECTRONIC DEVICE WITH DISPLAY RECORDING CAPABILITY

This application claims the benefit of U.S. Provisional Patent Application No. 63/433,340, filed Dec. 16, 2022, which is hereby incorporated by reference herein in its entirety.

FIELD

This relates generally to electronic devices, and, more particularly, to electronic devices such as head-mounted devices.

BACKGROUND

Electronic devices such as head-mounted devices can include hardware and software subsystems for performing gaze tracking, hands tracking, and head pose tracking on a user. Such electronic device can also include a graphics rendering module for generating virtual content that is presented on a display of the electronic device. The electronic device can also include a compositor that adjusts the virtual content based on the user tracking information prior to displaying the virtual content. The adjusted virtual content can then be output on the display to the user.

It can be challenging to record the content that is displayed to the user. The displayed content may be output at a first frame rate. The electronic device may record the content, however, at a second frame rate that is different than the first frame rate of the display. In such scenarios, the displayed content cannot simply be copied as the recorded content.

SUMMARY

An electronic device such as a head-mounted device with recording capabilities is provided. An aspect of this disclosure provides a method of operating an electronic device that includes capturing a video feed using one or more camera, merging first virtual content with the video feed to output a first set of merged video frames in accordance with a first parameter, displaying the first set of merged video frames, and merging second virtual content with the video feed to output a second set of merged video frames in accordance with a second parameter using a recording pipeline. The first set of merged video frames can be output in accordance with a first frame rate and/or a first set of image correction/adjustment parameters optionally encoded in the form of one or more compositor descriptors, whereas the second set of merged video frames can be output in accordance with a second frame rate different than the first frame rate and/or a second set of image correction/adjustment parameters optionally encoded in the form of one or more compositor descriptors. The first virtual content can be rendered using a graphics rendering pipeline. A virtual content compositor can generate the first and second sets of image correction/adjustment parameters based on user tracking information. The second virtual content can be generated based on the first virtual content and the second set of image correction/adjustment parameters optionally retrieved from the virtual content compositor.

An aspect of the disclosure provides a method of operating an electronic device that includes rendering virtual content using a graphics rendering pipeline, obtaining user tracking information using one or more tracking sensors, compositing virtual frames based on the virtual content and the user tracking information using a virtual content compositor, capturing a video feed using one or more cameras, merging the composited virtual frames and the captured video feed to output merged video frames having a first quality, and recording content having a second quality higher than the first quality using a recording pipeline. The merged video frames can be displayed. The display can optionally be disabled. The recorded content can be generated based on unfoveated content associated with only one eye.

An aspect of the disclosure provides a method of operating an electronic device that includes generating a first composited frame based on virtual content and user tracking information, displaying a first frame that is formed by merging the first composited frame with a passthrough video frame, creating a compositor descriptor listing a plurality of image correction functions or parameters applied when generating the first composited frame, generating a second composited frame based on the virtual content and the compositor descriptor, and recording a second frame that is formed by merging the second composited frame with the passthrough video frame. A first portion of the second frame can be different than a corresponding first portion of the first frame while a second portion of the second frame can be identical to a corresponding second portion of the first frame. Any sensitive information in the first portion of the first frame being displayed can be shown to the user, whereas that sensitive information in the first portion of the second frame being recorded can be blurred.

BRIEF DESCRIPTION OF THE DRAWINGS

FIG. 4 is a flow chart of illustrative steps for operating a head-mounted device of the type shown in FIG. 3 in accordance with some embodiments.

FIG. 6 is a flow chart of illustrative steps for operating a head-mounted device of the type shown in FIG. 5 in accordance with some embodiments.

DETAILED DESCRIPTION

An electronic device such as a head-mounted device may have one or more outward-facing cameras for capturing a live video feed of the physical environment surrounding a user of the head-mounted device. The electronic device can also include a graphics rendering engine for rendering virtual content, one or more tracking sensors for tracking eye gaze, head pose, hands gesture, or other parts of the user, and a virtual content compositor for generating composited virtual frames based on the virtual content output from the graphics rendering engine and the user tracking information output from the tracking sensors. The composited virtual frames can be overlaid or merged with the live video feed and presented on one or more displays to the user. The content output on the displays can have a first frame rate, sometimes referred to as the display frame rate.

The electronic device can include a recording pipeline for recording a version of the displayed content. The recording pipeline can record content at a second frame rate that is different than the first frame rate. The second frame rate, sometimes referred to as the recording frame rate, may be lower than the first frame rate. The recording pipeline may include a separate recording compositor configured to receive information such as one or more descriptors from the virtual content compositor. A descriptor may include a list of decisions that were made when generating the composited virtual frames based on the virtual content and the user tracking information. The descriptor can be stored in shared memory that is simultaneously accessible to the virtual content compositor and the recording compositor. The recording compositor can generate composited virtual frames having the second frame rate based on the virtual content output from the graphics rendering engine and the retrieved descriptor. The corresponding composited virtual frames output from the recording compositor can then be merged with the live video feed, where the merged output is subsequently recorded. Configured and operated in this way, a version of the displayed content can be recorded at a different frame rate without impacting user experience.

In some embodiments, the recording pipeline can be prioritized over the display pipeline to optimize recording quality. In such embodiments, a dynamic foveation function that increases the resolution of a portion of the display frame based on the user's gaze while lowering the resolution of surrounding areas can optionally be disabled. A higher quality recording can be achieved by rendering content for one eye at a higher resolution relative to the other eye and then recording only the higher resolution content. If desired, the display can be disabled entirely.

Figure 1:
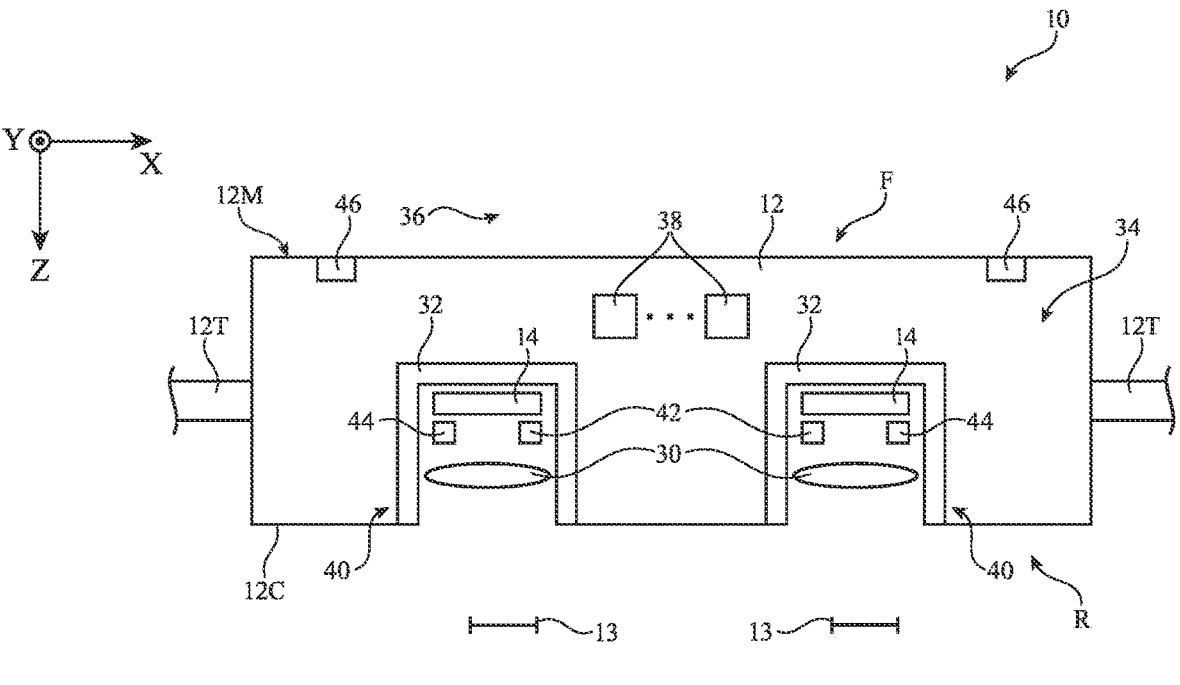
FIG. 1 is a top view of an illustrative head-mounted device in accordance with some embodiments.

A top view of an illustrative head-mounted device is shown in FIG. 1. As shown in FIG. 1, head-mounted devices such as electronic device 10 may have head-mounted support structures such as housing 12. Housing 12 may include portions (e.g., head-mounted support structures 12T) to allow device 10 to be worn on a user's head. Support structures 12T may be formed from fabric, polymer, metal, and/or other material. Support structures 12T may form a strap or other head-mounted support structures to help support device 10 on a user's head. A main support structure (e.g., a head-mounted housing such as main housing portion 12M) of housing 12 may support electronic components such as displays 14.

Main housing portion 12M may include housing structures formed from metal, polymer, glass, ceramic, and/or other material. For example, housing portion 12M may have housing walls on front face F and housing walls on adjacent top, bottom, left, and right side faces that are formed from rigid polymer or other rigid support structures, and these rigid walls may optionally be covered with electrical components, fabric, leather, or other soft materials, etc. Housing portion 12M may also have internal support structures such as a frame (chassis) and/or structures that perform multiple functions such as controlling airflow and dissipating heat while providing structural support.

The walls of housing portion 12M may enclose internal components 38 in interior region 34 of device 10 and may separate interior region 34 from the environment surrounding device 10 (exterior region 36). Internal components 38 may include integrated circuits, actuators, batteries, sensors, and/or other circuits and structures for device 10. Housing 12 may be configured to be worn on a head of a user and may form glasses, spectacles, a hat, a mask, a helmet, goggles, and/or other head-mounted device. Configurations in which housing 12 forms goggles may sometimes be described herein as an example.

Front face F of housing 12 may face outwardly away from a user's head and face. Opposing rear face R of housing 12 may face the user. Portions of housing 12 (e.g., portions of main housing 12M) on rear face R may form a cover such as cover 12C (sometimes referred to as a curtain). The presence of cover 12C on rear face R may help hide internal housing structures, internal components 38, and other structures in interior region 34 from view by a user.

Device 10 may have one or more cameras such as cameras 46 of FIG. 1. Cameras 46 that are mounted on front face F and that face outwardly (towards the front of device 10 and away from the user) may sometimes be referred to herein as forward-facing or front-facing cameras. Cameras 46 may capture visual odometry information, image information that is processed to locate objects in the user's field of view (e.g., so that virtual content can be registered appropriately relative to real-world objects), image content that is displayed in real time for a user of device 10, and/or other suitable image data. For example, forward-facing (front-facing) cameras may allow device 10 to monitor movement of the device 10 relative to the environment surrounding device 10 (e.g., the cameras may be used in forming a visual odometry system or part of a visual inertial odometry system). Forward-facing cameras may also be used to capture images of the environment that are displayed to a user of the device 10. If desired, images from multiple forward-facing cameras may be merged with each other and/or forward-facing camera content can be merged with computer-generated content for a user.

Device 10 may have any suitable number of cameras 46. For example, device 10 may have K cameras, where the value of K is at least one, at least two, at least four, at least six, at least eight, at least ten, at least 12, less than 20, less than 14, less than 12, less than 10, 4-10, or other suitable value. Cameras 46 may be sensitive at infrared wavelengths (e.g., cameras 46 may be infrared cameras), may be sensitive at visible wavelengths (e.g., cameras 46 may be visible cameras), and/or cameras 46 may be sensitive at other wavelengths. If desired, cameras 46 may be sensitive at both visible and infrared wavelengths.

Device 10 may have left and right optical modules 40. Optical modules 40 support electrical and optical components such as light-emitting components and lenses and may therefore sometimes be referred to as optical assemblies, optical systems, optical component support structures, lens and display support structures, electrical component support structures, or housing structures. Each optical module may include a respective display 14, lens 30, and support structure such as support structure 32. Support structure 32, which may sometimes be referred to as a lens support structure, optical component support structure, optical module support structure, or optical module portion, or lens barrel, may include hollow cylindrical structures with open ends or other supporting structures to house displays 14 and lenses 30. Support structures 32 may, for example, include a left lens barrel that supports a left display 14 and left lens 30 and a right lens barrel that supports a right display 14 and right lens 30.

Displays 14 may include arrays of pixels or other display devices to produce images. Displays 14 may, for example, include organic light-emitting diode pixels formed on substrates with thin-film circuitry and/or formed on semiconductor substrates, pixels formed from crystalline semiconductor dies, liquid crystal display pixels, scanning display devices, and/or other display devices for producing images.

Lenses 30 may include one or more lens elements for providing image light from displays 14 to respective eyes boxes 13. Lenses may be implemented using refractive glass lens elements, using mirror lens structures (catadioptric lenses), using Fresnel lenses, using holographic lenses, and/or other lens systems.

When a user's eyes are located in eye boxes 13, displays (display panels) 14 operate together to form a display for device 10 (e.g., the images provided by respective left and right optical modules 40 may be viewed by the user's eyes in eye boxes 13 so that a stereoscopic image is created for the user). The left image from the left optical module fuses with the right image from a right optical module while the display is viewed by the user.

It may be desirable to monitor the user's eyes while the user's eyes are located in eye boxes 13. For example, it may be desirable to use a camera to capture images of the user's irises (or other portions of the user's eyes) for user authentication. It may also be desirable to monitor the direction of the user's gaze. Gaze tracking information may be used as a form of user input and/or may be used to determine where, within an image, image content resolution should be locally enhanced in a foveated imaging system. To ensure that device 10 can capture satisfactory eye images while a user's eyes are located in eye boxes 13, each optical module 40 may be provided with a camera such as camera 42 and one or more light sources such as light-emitting diodes 44 or other light-emitting devices such as lasers, lamps, etc. Cameras 42 and light-emitting diodes 44 may operate at any suitable wavelengths (visible, infrared, and/or ultraviolet). As an example, diodes 44 may emit infrared light that is invisible (or nearly invisible) to the user. This allows eye monitoring operations to be performed continuously without interfering with the user's ability to view images on displays 14.

Figure 2:
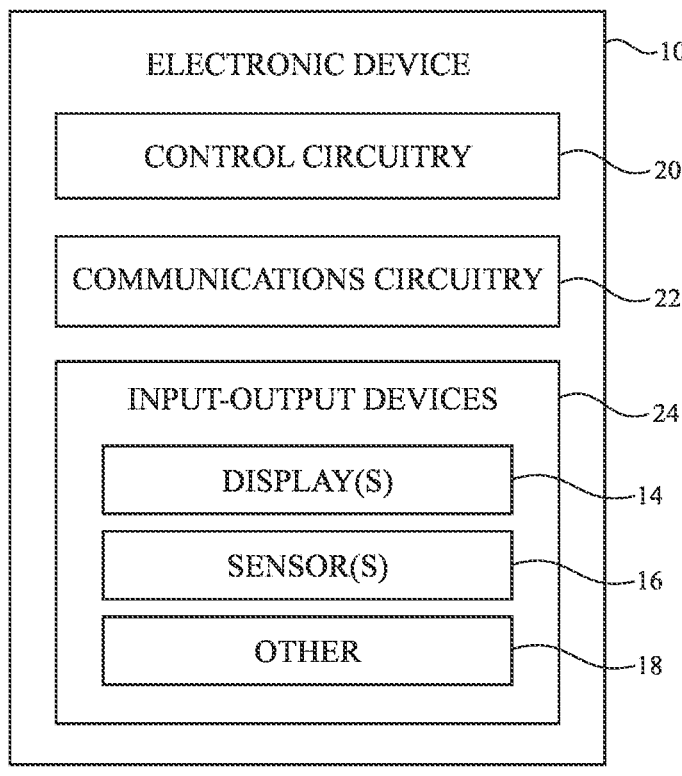
FIG. 2 is a schematic diagram of an illustrative head-mounted device in accordance with some embodiments.

A schematic diagram of an illustrative electronic device such as a head-mounted device or other wearable device is shown in FIG. 2. Device 10 of FIG. 2 may be operated as a stand-alone device and/or the resources of device 10 may be used to communicate with external electronic equipment. As an example, communications circuitry in device 10 may be used to transmit user input information, sensor information, and/or other information to external electronic devices (e.g., wirelessly or via wired connections). Each of these external devices may include components of the type shown by device 10 of FIG. 2.

As shown in FIG. 2, a head-mounted device such as device 10 may include control circuitry 20. Control circuitry 20 may include storage and processing circuitry for supporting the operation of device 10. The storage and processing circuitry may include storage such as nonvolatile memory (e.g., flash memory or other electrically-programmable-read-only memory configured to form a solid state drive), volatile memory (e.g., static or dynamic random-access-memory), etc. One or more processors in control circuitry 20 may be used to gather input from sensors and other input devices and may be used to control output devices. The processing circuitry may be based on one or more processors such as microprocessors, microcontrollers, digital signal processors, baseband processors and other wireless communications circuits, power management units, audio chips, application specific integrated circuits, etc. During operation, control circuitry 20 may use display(s) 14 and other output devices in providing a user with visual output and other output. Control circuitry 20 may be configured to perform operations in device 10 using hardware (e.g., dedicated hardware or circuitry), firmware, and/or software. Software code for performing operations in device 10 may be stored on storage circuitry (e.g., non-transitory (tangible) computer readable storage media that stores the software code). The software code may sometimes be referred to as program instructions, software, data, instructions, or code. The stored software code may be executed by the processing circuitry within circuitry 20.

To support communications between device 10 and external equipment, control circuitry 20 may communicate using communications circuitry 22. Circuitry 22 may include antennas, radio-frequency transceiver circuitry, and other wireless communications circuitry and/or wired communications circuitry. Circuitry 22, which may sometimes be referred to as control circuitry and/or control and communications circuitry, may support bidirectional wireless communications between device 10 and external equipment (e.g., a companion device such as a computer, cellular telephone, or other electronic device, an accessory such as a point device or a controller, computer stylus, or other input device, speakers or other output devices, etc.) over a wireless link.

For example, circuitry 22 may include radio-frequency transceiver circuitry such as wireless local area network transceiver circuitry configured to support communications over a wireless local area network link, near-field communications transceiver circuitry configured to support communications over a near-field communications link, cellular telephone transceiver circuitry configured to support communications over a cellular telephone link, or transceiver circuitry configured to support communications over any other suitable wired or wireless communications link. Wireless communications may, for example, be supported over a Bluetooth® link, a WiFi® link, a wireless link operating at a frequency between 10 GHz and 400 GHz, a 60 GHz link, or other millimeter wave link, a cellular telephone link, or other wireless communications link. Device 10 may, if desired, include power circuits for transmitting and/or receiving wired and/or wireless power and may include batteries or other energy storage devices. For example, device 10 may include a coil and rectifier to receive wireless power that is provided to circuitry in device 10.

Device 10 may include input-output devices such as devices 24. Input-output devices 24 may be used in gathering user input, in gathering information on the environment surrounding the user, and/or in providing a user with output. Devices 24 may include one or more displays such as display(s) 14. Display(s) 14 may include one or more display devices such as organic light-emitting diode display panels (panels with organic light-emitting diode pixels formed on polymer substrates or silicon substrates that contain pixel control circuitry), liquid crystal display panels, microelectromechanical systems displays (e.g., two-dimensional mirror arrays or scanning mirror display devices), display panels having pixel arrays formed from crystalline semiconductor light-emitting diode dies (sometimes referred to as microLEDs), and/or other display devices.

Sensors 16 in input-output devices 24 may include force sensors (e.g., strain gauges, capacitive force sensors, resistive force sensors, etc.), audio sensors such as microphones, touch and/or proximity sensors such as capacitive sensors such as a touch sensor that forms a button, trackpad, or other input device), and other sensors. If desired, sensors 16 may include optical sensors such as optical sensors that emit and detect light, ultrasonic sensors, optical touch sensors, optical proximity sensors, and/or other touch sensors and/or proximity sensors, monochromatic and color ambient light sensors, image sensors (e.g., cameras), fingerprint sensors, iris scanning sensors, retinal scanning sensors, and other biometric sensors, temperature sensors, sensors for measuring three-dimensional non-contact gestures ("air gestures"), pressure sensors, sensors for detecting position, orientation, and/or motion of device 10 and/or information about a pose of a user's head (e.g., accelerometers, magnetic sensors such as compass sensors, gyroscopes, and/or inertial measurement units that contain some or all of these sensors), health sensors such as blood oxygen sensors, heart rate sensors, blood flow sensors, and/or other health sensors, radio-frequency sensors, three-dimensional camera systems such as depth sensors (e.g., structured light sensors and/or depth sensors based on stereo imaging devices that capture three-dimensional images) and/or optical sensors such as self-mixing sensors and light detection and ranging (lidar) sensors that gather time-of-flight measurements (e.g., time-of-flight cameras), humidity sensors, moisture sensors, gaze tracking sensors, electromyography sensors to sense muscle activation, facial sensors, and/or other sensors. In some arrangements, device 10 may use sensors 16 and/or other input-output devices to gather user input. For example, buttons may be used to gather button press input, touch sensors overlapping displays can be used for gathering user touch screen input, touch pads may be used in gathering touch input, microphones may be used for gathering audio input (e.g., voice commands), accelerometers may be used in monitoring when a finger contacts an input surface and may therefore be used to gather finger press input, etc.

If desired, electronic device 10 may include additional components (see, e.g., other devices 18 in input-output devices 24). The additional components may include haptic output devices, actuators for moving movable housing structures, audio output devices such as speakers, light-emitting diodes for status indicators, light sources such as light-emitting diodes that illuminate portions of a housing and/or display structure, other optical output devices, and/or other circuitry for gathering input and/or providing output. Device 10 may also include a battery or other energy storage device, connector ports for supporting wired communication with ancillary equipment and for receiving wired power, and other circuitry.

Display(s) 14 can be used to present a variety of content to a user's eye. The left and right displays 14 that are used to present a fused stereoscopic image to the user's eyes when viewing through eye boxes 13 can sometimes be referred to collectively as a display 14. As an example, real-world content can be presented by display 14. "Real-world" content may refer to images of a physical environment being captured by one or more front-facing cameras (sec, e.g., cameras 46 in FIG. 1) and passed through as a live feed to the user. The real-world content being captured by the front-facing cameras is therefore sometimes referred to as a camera passthrough feed, a (live) video passthrough feed, or a passthrough video feed (stream).

A physical environment refers to a physical world that people can sense and/or interact with without the aid of an electronic device. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. In some embodiments, display 14 can be used to output extended reality (XR) content, which can include virtual reality content, augmented reality content, and/or mixed reality content.

Figure 3:
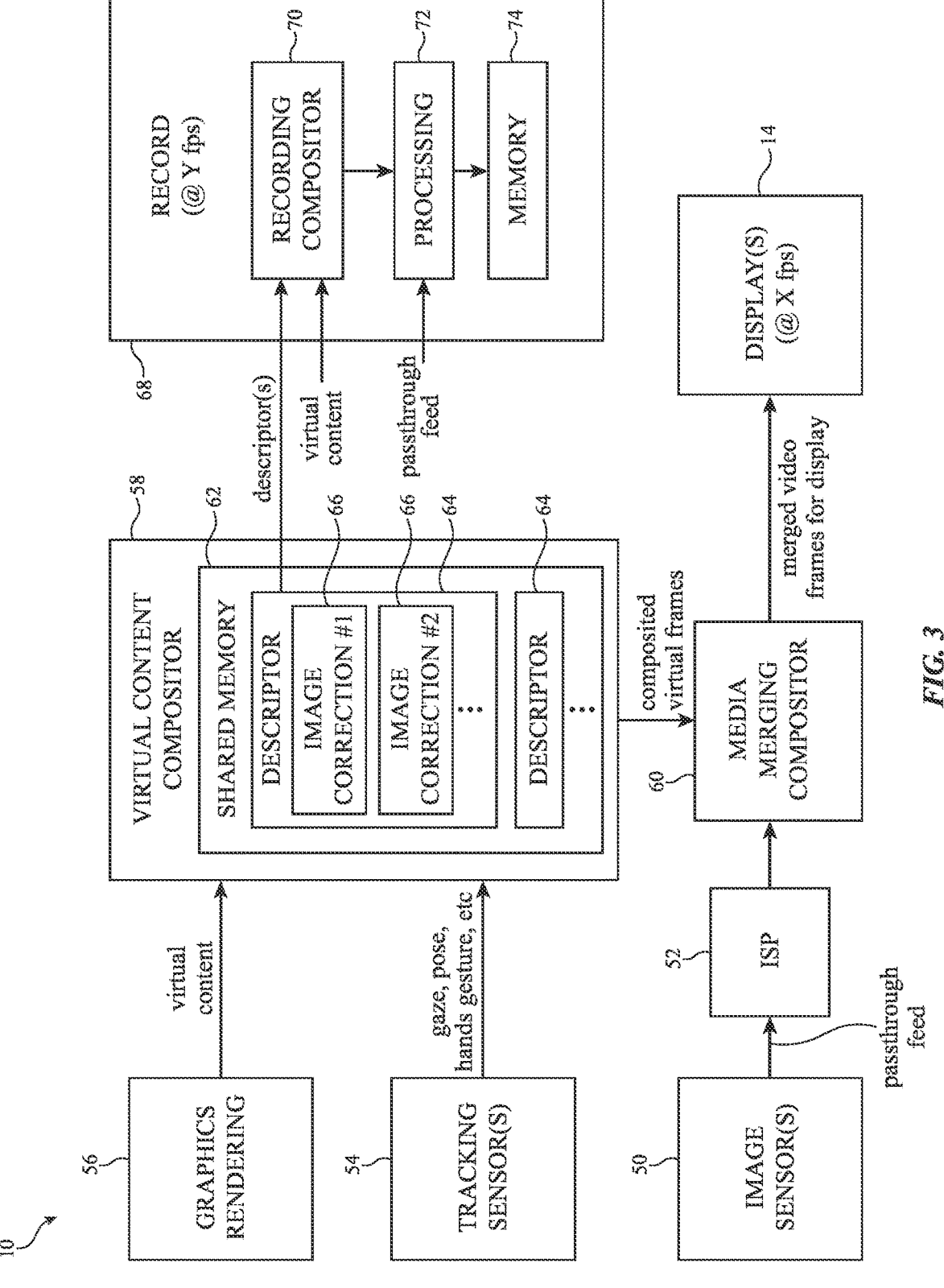
FIG. 3 is a diagram showing illustrative display and recording pipelines within a head-mounted device in accordance with some embodiments.

In certain applications, it may be desirable to record a version of the real-world content or the extended reality content that is presented on display 14 of head-mounted electronic device 10. Such recording can be stored back for later viewing, can be used for debugging or troubleshooting, or can be shared with external devices or a remote server. FIG. 3 is a diagram showing various hardware and software subsystems that can be included within device 10 for displaying content at a first frame rate and for separately recording a version of the displayed content at a second frame rate that is different than the first frame rate. As shown in FIG. 3, device 10 can include a graphics rendering subsystem such as graphics rendering pipeline 56, user tracking subsystems including one or more tracking sensor(s) 54, imaging subsystems including one or more image sensor(s) 50, an image signal processing subsystem such as image signal processor (ISP) 52, a virtual content compositing subsystem such as virtual content compositor 58, and a media merging subsystem such as media merging compositor 60.

Graphics rendering pipeline 56, sometimes referred to as a graphics rendering engine or graphics renderer, can be configured to render or generate virtual content (e.g., virtual reality content, augmented reality content, mixed reality content, or extended reality content) or may be used to carry out other graphics processing functions. The virtual content output from the graphics rendering pipeline can optionally be foveated (e.g., subsystem 56 can render foveated virtual content). Graphics rendering pipeline 56 can synthesize photorealistic or non-photorealistic images from one or more 2-dimensional or 3-dimensional model(s) defined in a scene file that contains information on how to simulate a variety of features such as information on shading (e.g., how color and brightness of a surface varies with lighting), shadows (e.g., how to cast shadows across an object), texture mapping (e.g., how to apply detail to surfaces), reflection, transparency or opacity (e.g., how light is transmitted through a solid object), translucency (e.g., how light is scattered through a solid object), refraction and diffraction, depth of field (e.g., how certain objects can appear out of focus when outside the depth of view), motion blur (e.g., how certain objects can appear blurry due to fast motion), and/or other visible features relating to the lighting or physical characteristics of objects in a scene. Graphics renderer 56 can apply rendering algorithms such as raster-ization, ray casting, ray tracing, radiosity, or other graphics processing algorithms.

Tracking sensors 54 can include a gaze tracking subsystem, sometime referred to as a gaze tracker, configured to gather gaze information or point of gaze information. The gaze tracker may employ one or more inward facing camera(s) and/or other gaze-tracking components (e.g., eye-facing components and/or other light sources that emit beams of light so that reflections of the beams from a user's eyes may be detected) to monitor the user's eyes. One or more gaze-tracking sensor(s) may face a user's eyes and may track a user's gaze. A camera in gaze-tracking subsystem may determine the location of a user's eyes (e.g., the centers of the user's pupils), may determine the direction in which the user's eyes are oriented (the direction of the user's gaze), may determine the user's pupil size (e.g., so that light modulation and/or other optical parameters and/or the amount of gradualness with which one or more of these parameters is spatially adjusted and/or the area in which one or more of these optical parameters is adjusted based on the pupil size), may be used in monitoring the current focus of the lenses in the user's eyes (e.g., whether the user is focusing in the near field or far field, which may be used to assess whether a user is day dreaming or is thinking strategically or tactically), and/or other gaze information. Cameras in the gaze tracker may sometimes be referred to as inward-facing cameras, gaze-detection cameras, eye-tracking cameras, gaze-tracking cameras, or eye-monitoring cameras. If desired, other types of image sensors (e.g., infrared and/or visible light-emitting diodes and light detectors, etc.) may also be used in monitoring a user's gaze.

Tracking sensors 54 can also include a face and body tracking subsystem configured to perform face tracking (e.g., to capture images of the user's jaw, mouth, etc. while the device is worn on the head of the user) and body tracking (e.g., by capturing images of the user's torso, arms, hands, legs, etc. while the device is worn on the head of user). If desired, the face and body tracking subsystem can also track a user's head pose by directly determining any movement, yaw, pitch, roll, etc. for head-mounted device 10. The yaw, roll, and pitch of the user's head may collectively define a user's head pose.

Tracking sensor 54 can further include a hands tracking subsystem, sometimes referred to as a hands tracker, configured to monitor a user's hand motion/gesture to obtain hand gestures data. For example, the hands tracker may include a camera and/or other gestures tracking components (e.g., outward facing components and/or light sources that emit beams of light so that reflections of the beams from a user's hand may be detected) to monitor the user's hand(s). One or more hands-tracking sensor(s) 54 may be directed towards a user's hands and may track the motion associated with the user's hand(s), may determine whether the user is performing a swiping motion with his/her hand(s), may determine whether the user is performing a non-contact button press or object selection operation with his/her hand(s), may determine whether the user is performing a grabbing or gripping motion with his/her hand(s), may determine whether the user is pointing at a given object that is presented on display 14 using his/her hand(s) or fingers, may determine whether the user is performing a waving or bumping motion with his/her hand(s), or may generally measure/monitor three-dimensional non-contact gestures ("air gestures") associated with the user's hand(s). Tracking sensors 54 operable to obtain gaze, pose, hands gesture, and other information relating to a motion of a user of device 10 are sometimes referred to as user tracking sensors.

The virtual content generated by graphics rendering pipeline 56 and the user tracking information (e.g., point of gaze information, head pose information, hands gesture information, and information associated with other user body parts) output from user tracking sensors 54 can be conveyed to virtual content compositor 58. Based on content and information from multiple data sources, virtual content compositor 58 can generate corresponding composited virtual frames. The virtual content compositor 58 can perform a variety of compositor functions that adjusts the virtual content based on the user tracking information to help improve the image quality of the final content that will be displayed to the user. The adjustments to virtual content may be performed by virtual content compositor 58 and/or media merging compositor 60.

For example, virtual content compositor 58 can perform image warping operations to reproject the virtual content from one user perspective to another, dynamic foveation operations that adjust the detail or quality of a video feed based on the user's gaze (e.g., by increasing image detail or resolution of a video feed in the area of the user's gaze and/or reducing image detail or resolution of the video feed in areas not aligned with the user's gaze), lens distortion compensation operations to fix issues associated with the distortion that might be caused by lens(es) 30 in front of display 14, brightness adjustments, color shifting, chromatic aberration correction, optical crosstalk mitigation operations, and/or other optical correction processes to enhance the apparent quality of the composited virtual frames.

The decisions made by the virtual content compositor 58 or other display control functions to generate each composited virtual frame can be listed in a compositor descriptor such as descriptor 64. Descriptor 64 can include a list of image correction/adjustment parameters that were used in generating a corresponding composited virtual frame, including but not limited to which input frame(s) are used from the virtual content, a particular gaze parameter from the gaze tracker, a particular head pose parameter from the body tracker that can be used to determine how the image warping operations will be carried out, a particular hands gesture parameter from the hands tracker, a particular foveation parameter used in performing the dynamic foveation, a particular lens distortion compensation parameter, a particular brightness adjustment, a particular amount or type of color shifting, and/or a particular amount or degree of chromatic aberration correction that is currently being employed to generate that composited virtual frame.

The image correction or adjustment can be applied at virtual content compositor 58 or some other component such as media merging compositor 60. In embodiments where the image correction/adjustment is performed at media merging compositor 60, virtual content compositor 58 can send a mesh that includes corrections based on gaze parameter(s), head pose parameter(s), hands gesture parameter(s), image warping parameter(s), foveation parameter(s), brightness adjustment parameter(s), color adjustment parameter(s), chromatic aberration correction parameter(s), point of view correction parameter(s), and/or other parameters to media merging compositor 60. These correction parameters can be sent in the form of one or more compositor descriptor(s) 64, if desired, from virtual content compositor 58 to media merging compositor 60.

Operated in this way, virtual content compositor 58 can relay its image correction decisions to media merging compositor 60, and media merging compositor 60 can then execute those decisions on the virtual frames and/or the passthrough feed and subsequently perform the desired merging or blending of the corrected video frames. As a result, the merged video frames being conveyed to display 14 can be output in accordance with a first frame rate and/or a first set of image correction parameters provided from virtual content compositor 58 to media merging compositor 60, whereas the video frames being recorded in the recording pipeline 68 can be output in accordance with a second frame rate different than the first frame rate and/or a second set of image correction parameters provided from virtual content compositor 58 to recording pipeline 68.

A separate compositor descriptor 64 can be generated for each composited virtual frame. A plurality of compositor descriptors 64 corresponding to a series of composited virtual frames can be stored in a shared memory 62. Shared memory 62 may be implemented as volatile memory 38 such as random-access memory (e.g., dynamic RAM or static RAM). Alternatively, shared memory 62 might also be implemented as non-volatile memory. Examples of non-volatile memory include flash memory, solid-state drive (SSD), read-only memory (ROM), electrically programmable ROM, disk storage, hard disk drive, optical disc, etc. Each descriptor 64 can be a relatively small amount of data. Each descriptor 64 can, for example, be only hundreds or thousands of bytes of data (e.g., less than five kB of data, less than 10 kB of data, less than 100 kB of data, or less than one megabyte of data).

The composited virtual frames can be merged with a live video feed captured by one or more image sensor(s) 50 prior to being output at display 14. Sensors 50 may include one or more front-facing camera(s) and/or other cameras used to capture images of the external real-world environment surrounding device 10. A video feed output from camera(s) 50 can sometimes be referred to as the raw video feed or a live passthrough video stream. The passthrough feed output from camera(s) 50 can be processed by image signal processor (ISP) 52 configured to perform image signal processing functions that only rely on the input of the live camera feed itself. For example, ISP block 52 may be configured to perform automatic exposure for controlling an exposure setting for the passthrough video feed, automatic color correction (sometimes referred to as automatic white balance) for controlling a white balance, tone curve mapping, gamma correction, shading correction, noise reduction, black level adjustment, demosaicing, image sharpening, high dynamic range (HDR) correction, color space conversion, and/or other image signal processing functions (just to name a few) to output corresponding processed video frames.

Media merging compositor 60 may receive the processed video frames output from image signal processor 52, may receive the composited virtual frames output from virtual content compositor 58, and may overlay or other combine one or more portions of the composited virtual frames with the processed video frames to obtain corresponding merged video frames. The merged video frames output from the media merging compositor 60 can then be presented on display 14 to be viewed by the user of device 10. In the example of FIG. 3, the merged video frames may be displayed at a frame rate of X frames per second (fps). To accomplish this, virtual content compositor 58 may generate the composited virtual frames at X fps. As an example, X may be 90 fps. This is merely illustrative. In general, the content presented on display 14 can be output at less than 90 fps, 60 fps or less, 50 fps or less, 30 fps or less, greater than 90 fps, 120 fps, 150 fps, or other display frame rate.

To provide device 10 with recording capabilities, device 10 can include a separate recording subsystem such as recording pipeline 68. In contrast to the display pipeline which outputs merged video frames at X fps, the recording pipeline 68 can render or generate video frames for recording at Y fps, where Y is different than X. The recording frame rate Y may be less than the display frame rate X. As an example, Y may be 30 fps when X is 90 fps. This is merely illustrative. The recording frame rate Y may optionally be greater than the display frame rate X. In general, the content being recorded at the recording pipeline 68 can be rendered at less than 30 fps. 20 fps or less, 10 fps or less, greater than 30 fps, 60 fps, 90 fps, 120 fps, or other recording frame rate.

As shown in FIG. 3, recording pipeline 68 may include a recording compositor 70, a recorder processing block 72, and recorder memory 74. Recording compositor 70 may receive virtual content output from graphics rendering pipeline 56 and may retrieve one or more compositor descriptor(s) from shared memory 62. Operated in this way, recording compositor 70 can generate an equivalent composited virtual frame for recording purposes at a different frame rate using the image correction parameters or decisions listed in the retrieved descriptor(s) 64. Virtual frames output from recording compositor 70 is sometimes referred to or defined herein as "recomposited" virtual frames (e.g., virtual frames recomposited at a different frame rate or otherwise with different parameters than frames composited and displayed at display 14). The composited virtual frames output from the recording compositor 70 can optionally be merged, using recording processor 72, with the processed live passthrough feed output from the image signal processor 52. The merged video frames output from recording processor 72 can then be stored or recorded in memory 74. This example in which the merged content is being recorded is merely illustrative. If desired, the composited virtual frames output from recording compositor 70 and the processed passthrough feed can be separately stored at memory 74 without being merged together. In other suitable embodiments, the recording compositor 70 can output different layers (or files) each based on a different image correction parameter in the retrieved descriptor and the various layers (files) can be separately stored or recorded on memory 74 without being merged with any other layers or passthrough frames. For example, recording compositor 70 might output a passthrough video feed, recomposited virtual content frames generated based on the descriptors 64, a hands matting file obtained using a hands tracking subsystem, and/or other independent output streams for later processing. The embodiments described herein are not limited to video recordings. If desired, one or more still images can be captured and stored in memory 74. The captured image(s) can include real-world content acquired using image sensors 50 and/or virtual content composited using block 70.

In addition to the merging operation, recording processor 72 can optionally perform additional operations such as selecting a subset of the received frames for recording (e.g., selecting alternating frames to be recorded, selecting one out of every three frames to be recorded, selecting one out of every four frames to be recorded, selecting one out of every five to ten frames for recording, etc.), limiting the rendered frames to a smaller field of view (e.g., limiting the X dimension of the rendered content, limiting the Y dimension of the rendered content, or otherwise constraining the size or scope of the frames to be recorded), undistorting the rendered content since the content being recorded might not be viewed through a lens during later playback, and video matting, just to name a few. The video matting operations can determine whether each portion of the recorded content shows the composited virtual content or the live passthrough content. In certain scenarios, the video matting operations might decide to show more of the live passthrough content when doing so would enhance the safety of the user (e.g., such as when a user might be moving towards an obstacle). In other scenarios, the video matting operations might intentionally obscure or blur a portion of the virtual content (e.g., such as when a user inputs a password or other sensitive information on the display screen, and the sensitive information can be obfuscated in the recording). These examples are merely illustrative. In another embodiment, a hands matting operation might detect a user's hand(s) in the passthrough feed and extract only that portion from the passthrough video feed. The extracted portion can later be blended with virtual content targeting only the user's hand(s). In general, the recording processor 72 can create or output recorded content that is at least partially different than the content that is being output from display 14.

To help protect the privacy of users, any personal user information that is gathered by sensors may be handled using best practices. These best practices including meeting or exceeding any privacy regulations that are applicable. Opt-in and opt-out options and/or other options may be provided that allow users to control usage of their personal data.

FIG. 4 is a flow chart of illustrative steps for operating the various subsystems of the type described in connection with FIG. 3. During the operations of block 80, virtual content compositor 58 may receive information from multiple data sources. For instance, virtual content compositor 58 can receive the rendered virtual content from graphics rendering pipeline 56 and can also receive user tracking information including gaze, head pose, and hands gesture information from one or more tracking sensors 54.

During the operations of block 82, virtual content compositor 58 may generate a series of composited virtual frames based on the received virtual content and the user tracking information and may, for each of the composited virtual frames, build a descriptor 64 listing image correction functions and/or parameters used to composite each respective virtual frame. As examples, the compositor descriptor may show which input frames are being used for compositing, the gaze parameter currently being used for dynamic foveation, the head pose currently being used for image reprojection operations, whether or not lens distortion compensation is employed and the degree by which it is being applied to a virtual frame, whether or not brightness is being adjusted and the degree by which brightness has been adjusted, whether or not color shifting is being employed and the degree by which it is being applied to the virtual frame, whether or not chromatic aberration correction has been employed and the degree by which it is being applied to the virtual frame, just to name a few illustrative compositor functions. The descriptors 64 can be saved in shared memory 62 that is accessible to a separate recording pipeline such as recording pipeline 68.

During the operations of block 84, the composited virtual frames output from virtual content compositor 58 can be merged with the processed live video feed captured by the outward-facing cameras and modified by image signal processor 52 to generate corresponding merged video frames that are then conveyed to display 14 for outputting to the user of device 10. The real-world content and/or the extended reality content being presented on the one or more display(s) 14 can be processed at a first (X) frame rate sometimes referred to as the display frame rate.

During the operations of block 86, the recording pipeline 68 may retrieve one or more compositor descriptor(s) 64 from the shared memory 62. During the operations of block 88, recording compositor 70 within the recording pipeline can generate a corresponding recomposited virtual frame that is rendered at a second (Y) frame rate sometimes referred to as the recording frame rate. The second (recording) frame rate may be different than the first (display) frame rate. As an example, the recording frame rate may be less than or may be a fraction of the display frame rate. As another example, the recording frame rate may be greater than or may be some multiple of the display frame rate. The recomposited virtual frames can represent a version of the composited virtual frames that are output from virtual content compositor 58 but having a different frame rate. The content of the recomposited virtual frames output from the recording compositor 70 can be identical, similar, or partially different than the content of the composited virtual frames output from virtual content compositor 58.

During the operations of block 90, the recomposited virtual frames output from the recording compositor 70 may be merged with the passthrough video feed captured from the outward-facing camera(s) using processor 72. Recording processor 72 can optionally perform additional image processing such as selecting a subset of the merged frames for recording, reducing the field of view of the merged frames, undistorting the rendered content, and performing video matting on one or more portions of the merged video frames. The processed video content can then be saved to memory 74. The corresponding video content stored on memory 74 can be referred to as the recorded content. The recorded content can be identical, similar, or partially different than the displayed content output by display 14. The recorded content stored on memory 74 need not be limited to video content. If desired, one or more still images identical or similar to a corresponding frame in the passthrough video feed can be processed by the recording pipeline and stored on memory 74.

The recording methodology described in connection with FIGS. 3 and 4 can involve dynamic foveation, which locally enhances the image resolution of a video frame in an area of the user's gaze while decreasing the image resolution of the video frame in areas outside or surrounding the user's gaze. While foveation techniques can help reduce power consumption and improve rendering speed, foveation will tend to degrade the quality of the recorded content since upon playback, the user can focus on any part of the recorded frame(s) including the lower resolution portions of the recorded frames.

Figure 5:
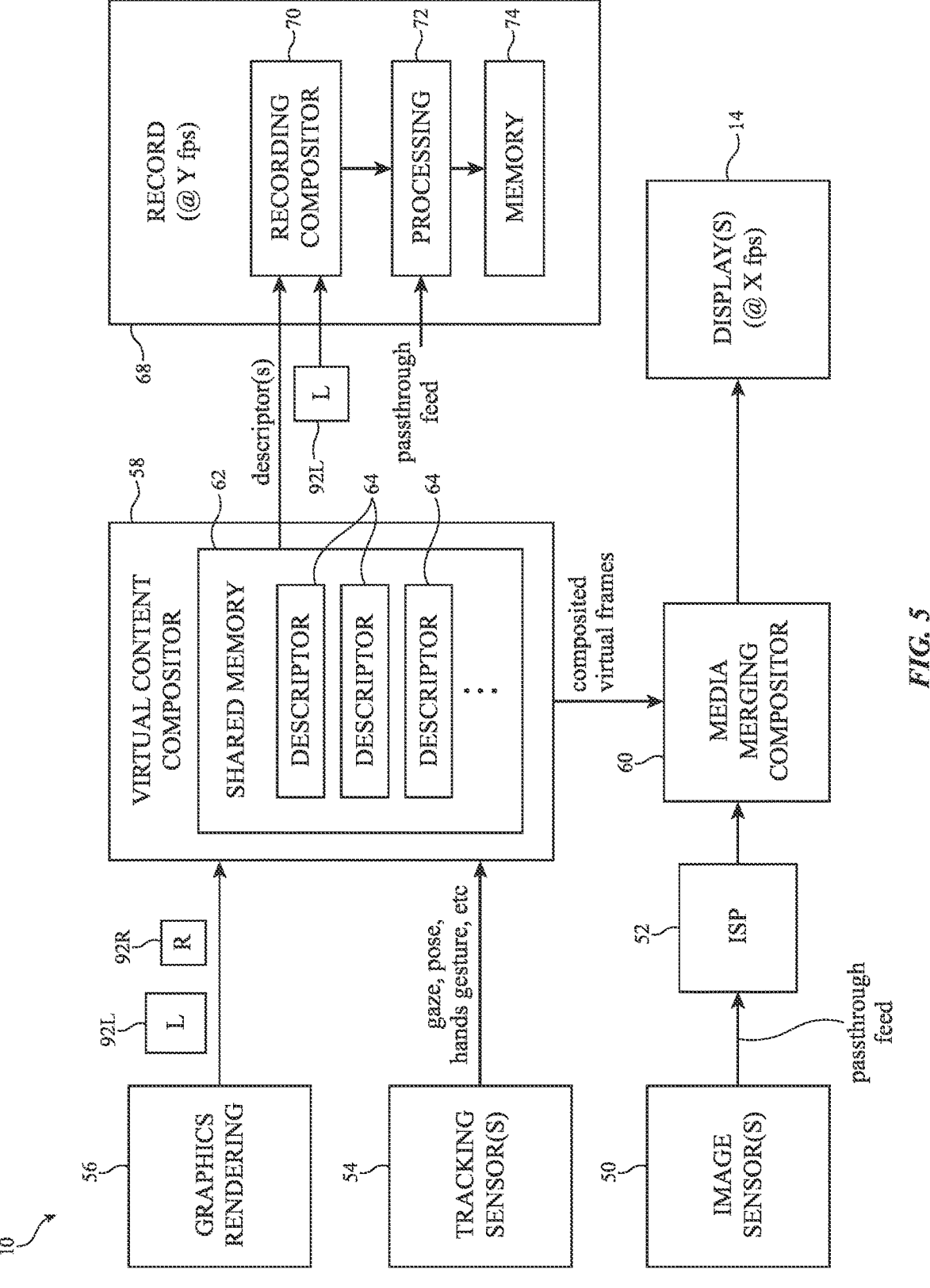
FIG. 5 is a diagram showing an illustrative display and recording pipelines that prioritizes the recording function over the display function in accordance with some embodiments.

In accordance with some embodiments, the graphics rendering pipeline and the recording compositor pipeline can be modified to prioritize or optimize for recording quality while optionally sacrificing the quality of the displayed content. In the example of FIG. 5, the graphics rendering pipeline 56 can be configured to render virtual content at a higher resolution for the left (L) eye while rendering virtual content at a relatively lower resolution for the right (R) eye. For instance, the virtual content for the left eye (see left eye frame 92L) may be unfoveated with a high (full) resolution, whereas the virtual content for the right eye (see right eye frame 92R) may also be unfoveated but at a substantially lower resolution. For example, the overall size or pixel count of left eye content (frame) 92L may be at least two times larger, at least three times larger, at least four times larger, two to five times larger, five to ten times larger, or more than ten times larger than the overall size or pixel count of the right eye content (frame) 92R.

Using left eye and right eye virtual frames rendered at different high and low resolutions to generate the final display content can potentially compromise the quality of the final display content output from display 14. If desired, display 14 can optionally be disabled entirely if the display quality is below a given threshold. Feeding high resolution unfoveated virtual content to the recording pipeline, however, can ensure that the content is being recorded at optimal quality. As shown in FIG. 5, recording compositor 70 may receive one or more descriptor(s) from the shared memory and may receive only the unfoveated left eye content 92L rendered at high (full) resolution. Recording compositor 70 can ignore the lower resolution right eye content 92R entirely. If desired, the passthrough feed can optionally be fed to the recording compositor to help synchronize pacing to match the available video frames (without actually using the content of the passthrough feed)

Operated in this way, recording compositor 70 can generate an equivalent high quality or high (full) resolution composited virtual frame recording purposes. Virtual frames output from recording compositor 70 in this way is sometimes referred to or defined herein as "recomposited" virtual frames (e.g., virtual frames recomposited at a higher quality or resolution relative to the frames to be displayed). The (re)composited virtual frames output from the recording compositor 70 can optionally be merged, using recording processor 72, with the processed live passthrough feed output from the image signal processor 52. Recording processor 72 can optionally perform additional image processing such as selecting a subset of the merged frames for recording, reducing the field of view of the merged frames, undistorting the rendered content, and performing video matting on one or more portions of the merged video frames. The processed video content can then be saved to memory 74. The corresponding video content stored on memory 74 can be referred to as the recorded content. The recorded content can be identical, similar, or partially different than the displayed content output by display 14. If desired, the composited virtual frames output from recording compositor 70 and the processed passthrough feed can be separately stored at memory 74 without being merged together. The architecture of the remaining subsystems shown in FIG. 5 are identical to those already described in connection with FIG. 3 and need not be repeated to avoid obscuring the present embodiment.

The example of FIG. 5 in which the graphics rendering pipeline and the recording pipeline use a higher quality left eye content and a lower quality right eye content is merely illustrative. In other embodiments, the graphics rendering pipeline and the recording pipeline might employ an alternate scheme that renders the right eye content at a higher resolution relative to the left eye content. In such scenarios, the recording pipeline might only receive the higher resolution (unfoveated) right eye content while entirely ignoring the lower resolution left eye content. For example, the overall size or pixel count of right eye content (frame) 92R might be at least two times larger, at least three times larger, at least four times larger, two to five times larger, five to ten times larger, or more than ten times larger than the overall size or pixel count of the left eye content (frame) 92L.

FIG. 6 is a flow chart of illustrative steps for operating the various subsystems of FIG. 5 to prioritize the recording quality over the display quality. During the operations of block 100, virtual content compositor 58 may receive information from multiple data sources. For instance, virtual content compositor 58 can receive the rendered virtual content from graphics rendering pipeline 56 (e.g., including virtual content for one eye rendered at higher quality/ resolution) and can also receive user tracking information including gaze, head pose, and hands gesture information from one or more tracking sensors 54.

During the operations of block 102, virtual content compositor 58 may generate a series of composited virtual frames based on the received virtual content (e.g., left and right eye content at different resolutions) and the user tracking information and may, for each of the composited virtual frames, build a descriptor 64 listing image correction functions and/or parameters used to composite each respective virtual frame. As examples, the compositor descriptor may show which input frames are being used for compositing, the gaze parameter currently being used for dynamic foveation, the head pose currently being used for image reprojection operations, whether or not lens distortion compensation is employed and the degree by which it is being applied to a virtual frame, whether or not brightness is being adjusted and the degree by which brightness has been adjusted, whether or not color shifting is being employed and the degree by which it is being applied to the virtual frame, whether or not chromatic aberration correction has been employed and the degree by which it is being applied to the virtual frame, just to name a few illustrative compositor functions. The descriptors 64 can be saved in shared memory 62 that is accessible to a separate recording pipeline such as recording pipeline 68.

During the operations of block 104, the composited virtual frames output from virtual content compositor 58 can be merged with the processed live video feed captured by the outward-facing cameras and modified by image signal processor 52 to generate corresponding merged video frames that are then conveyed to display 14 for outputting to the user of device 10. The real-world content and/or the extended reality content being presented on the one or more display(s) 14 can be processed at a first (X) frame rate sometimes referred to as the display frame rate.

During the operations of block 106, the recording pipeline 68 may retrieve one or more compositor descriptor(s) 64 from the shared memory 62. During the operations of block 106, recording compositor 70 within the recording pipeline can generate a corresponding recomposited virtual frame, using only the higher resolution content associated with one eye, that is rendered at a second (Y) frame rate sometimes referred to as the recording frame rate. The second (recording) frame rate may be different than the first (display) frame rate. As an example, the recording frame rate may be less than or may be a fraction of the display frame rate. As another example, the recording frame rate may be greater than or may be some multiple of the display frame rate. The content of the recomposited virtual frames output from the recording compositor 70 can have higher resolution (quality) than the content of the composited virtual frames output from virtual content compositor 58.

During the operations of block 108, the high quality (resolution) virtual frames output from the recording compositor 70 may be merged with the passthrough video feed captured from the outward-facing camera(s) using processor 72. Recording processor 72 can optionally perform additional image processing such as selecting a subset of the merged frames for recording, reducing the field of view of the merged frames, undistorting the rendered content, and performing video matting on one or more portions of the merged video frames. The processed video content can then be saved to memory 74. The corresponding video content stored on memory 74 can be referred to as the recorded content. The recorded content can exhibit higher quality (resolution) than the displayed content output by display 14.

The methods and operations described above in connection with FIGS. 1-6 may be performed by the components of device 10 using software, firmware, and/or hardware (e.g., dedicated circuitry or hardware). Software code for performing these operations may be stored on non-transitory computer readable storage media (e.g., tangible computer readable storage media) stored on one or more of the components of device 10 (e.g., the storage circuitry within control circuitry 20 of FIG. 1). The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of device 10 (e.g., one or more processors in control circuitry 20). The processing circuitry may include microprocessors, application processors, digital signal processors, central processing units (CPUs), application-specific integrated circuits with processing circuitry, or other processing circuitry.

The foregoing is merely illustrative and various modifications can be made to the described embodiments. The foregoing embodiments may be implemented individually or in any combination.

What is claimed is:

1. A method, comprising:
with one or more cameras, capturing a video feed;
with a gaze sensor, obtaining gaze information;
with a graphics rendering pipeline, rendering first and second virtual content in accordance with first and second depth information, respectively;
merging the first virtual content with the video feed based on the gaze information to output a first set of merged video frames in accordance with a first parameter;
displaying the first set of merged video frames; and
with a recording pipeline, merging the second virtual content with the video feed to output a second set of merged video frames in accordance with a second parameter.

2. The method of claim 1, wherein the first set of merged video frames is output in accordance with a display frame rate, wherein the first set of merged video frames is displayed at the display frame rate, and wherein the second set of merged video frames is output in accordance with a recording frame rate different than the display frame rate, the method further comprising:
storing the second set of merged video frames at the recording frame rate and as recorded content.

3. The method of claim 2, wherein the recording frame rate is less than the display frame rate.

4. The method of claim 2, wherein the display frame rate is a multiple of the recording frame rate.

5. The method of claim 1, wherein displaying the first set of merged video frames comprises displaying the first set of merged video frames as augmented reality (AR) or mixed reality (MR) content.

6. The method of claim 1, further comprising:
with one or more tracking sensors, obtaining user tracking information; and
with a virtual content compositor, generating descriptors based on the user tracking information or the gaze information, wherein each of the descriptors lists a plurality of image correction functions or image correction parameters applied to the first virtual content prior to being merged with the video feed.

7. The method of claim 6, wherein obtaining user tracking information comprises obtaining sensor data selected from the group consisting of: head pose information and hands gesture information.

8. The method of claim 6, wherein the plurality of image correction functions or image correction parameters in at least some of the descriptors includes an image warping parameter, a point of view correction parameter, a foveation parameter, or a lens distortion compensation parameter.

9. The method of claim 6, wherein the plurality of image correction functions or image correction parameters in at least some of the descriptors includes a brightness adjustment parameter, a color shift parameter, or a chromatic aberration correction parameter.

10. The method of claim 6, further comprising:
storing the descriptors in shared memory that is accessible to the virtual content compositor and the recording pipeline; and
with the recording pipeline, retrieving the descriptors from the shared memory and compositing the second virtual content based on the retrieved descriptors.

11. The method of claim 1, further comprising:
storing the second set of merged video frames as recorded content; and
reducing a field of view of the second set of merged video frames prior to storing the second set of merged video frames as the recorded content.

12. The method of claim 1, further comprising:
with one or more tracking sensors, obtaining user tracking information; and
with a virtual content compositor, compositing virtual frames based on the first virtual content and the user tracking information or the gaze information, wherein merging the first virtual content with the video feed comprises merging the composited virtual frames with the video feed to output the first set of merged video frames, wherein the first set of merged video frames has a first quality, and wherein the second set of merged video frames has a second quality higher than the first quality.

13. The method of claim 12, further comprising:
disabling a display of the electronic device to prevent the display from presenting the first set of merged video frames of the first quality.

14. The method of claim 12, wherein rendering the first virtual content comprises:
rendering first unfoveated content intended for a first eye and having a first resolution;
rendering second unfoveated content intended for a second eye and having a second resolution less than the first resolution; and
conveying the first unfoveated content to the recording pipeline without conveying the second unfoveated content to the recording pipeline.

15. The method of claim 14, wherein:
the first set of merged video frames is displayed at a first frame rate; and
the second set of merged video frames has a second frame rate that is different than the first frame rate.

16. The method of claim 1, further comprising:
generating a first composited frame based on the first virtual content and user tracking information or the gaze information, wherein merging the first virtual content with the video feed comprises merging the first composited frame with the video feed to output a first frame of the first set of merged video frames;
creating a compositor descriptor listing a plurality of image correction functions or image correction parameters applied when generating the first composited frame; and
generating a second composited frame based on the second virtual content and the compositor descriptor, wherein merging the second virtual content with the video feed comprises merging the second composited frame with the video feed to output a second frame of the second set of merged video frames and wherein a first portion of the second frame is different than a corresponding first portion of the first frame while a second portion of the second frame is identical to a corresponding second portion of the first frame.

17. The method of claim 16, wherein the first portion of the first frame being displayed shows sensitive information, and wherein the first portion of the second frame being recorded is blurred to obfuscate the sensitive information.

18. A method, comprising:

with a camera, capturing a video feed;

merging first virtual content with the video feed to output a first set of merged video frames having a first resolution;

displaying the first set of merged video frames; and with a recording pipeline, merging second virtual content with the video feed to output a second set of merged video frames having a second resolution higher than the first resolution and recording the second set of merged video frames.

19. A method, comprising:

with one or more cameras, capturing a video feed;

with a graphics rendering pipeline, rendering first and second virtual content;

with one or more tracking sensors, obtaining user tracking information;

with a first compositor, generating a descriptor based on the user tracking information and compositing first virtual frames based on the first virtual content and the descriptor;

storing the descriptor in memory that is accessible to the first compositor and a second compositor; and with the second compositor, retrieving the descriptor from the memory and compositing second virtual frames based on the second virtual content and the retrieved descriptor.

20. The method of claim 19, further comprising:

merging the first virtual frames with the video feed to output a first set of merged video frames;

displaying the first set of merged video frames;

merging the second virtual frames with the video feed to output a second set of merged video frames; and storing the second set of merged video frames.

* * * * *